Oct. 19, 1948.            C. C. FULTON            2,451,937
ATTACHABLE TRACTION LUG RIM
Filed April 27, 1946
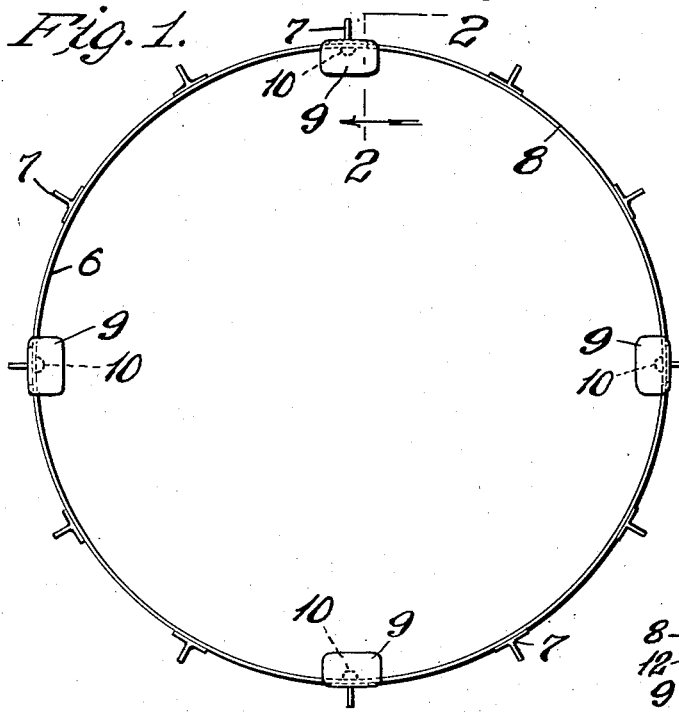
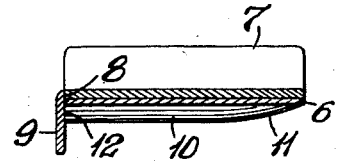
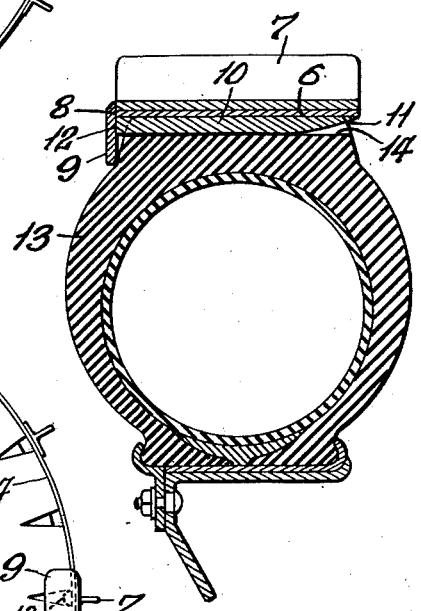
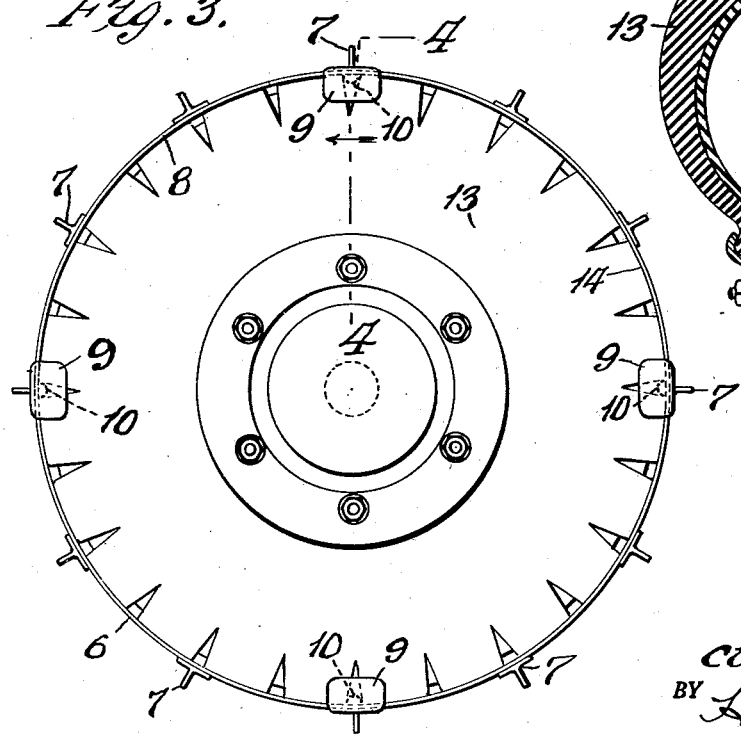
INVENTOR.
Claude C. Fulton
BY Herbert G. Fletcher
atty.

Patented Oct. 19, 1948

2,451,937

UNITED STATES PATENT OFFICE 2,451,937

ATTACHABLE TRACTION LUG RIM

Claude C. Fulton, Florissant, Mo.

Application April 27, 1946, Serial No. 665,477

5 Claims. (Cl. 152—174)

This invention relates to improvements in a traction lug rim for the traction wheels of tractors and the like, and is of a construction which goes to the simplicity of manufacture and to the adaptability of mounting and securing the rim on the tread of a pneumatic tire and is particularly adapted to the garden variety of tractors.

An object of the invention is to provide an improved traction lug rim to be fitted over and secured on a particular size of a pneumatic tire for a traction wheel.

A further object is to provide a lug rim for a pneumatic tire of a tractor wheel of a construction whereby the inflated tire cooperates with the rim for mounting it on the tire.

A still further object is to provide a lug rim for a pneumatic tire which is slidably cooperable over the tire tread and having side disposed projections for engagement with the side wall of the tire.

Still another object is to provide a traction lug rim with projections for interlocking engagement with the tread of a pneumatic traction wheel tire.

With the foregoing and other objects in view which will appear as the description proceeds, my invention resides in the combination and arrangement of parts and in the details of construction hereinafter described and claimed, it being understood that changes may be made within the scope of what is claimed without departing from the spirit and intents of the invention.

An embodiment of the invention is illustrated in the accompanying drawing, wherein:

Figure 1 is a side elevation of this improved traction lug rim.

Figure 2 is an enlarged transverse section taken approximately on the line 2—2 of Fig. 1.

Figure 3 is a side elevation of a pneumatic tire and wheel with this improved traction lug rim mounted thereon.

Figure 4 is an enlarged transverse section taken on line 4—4 of Fig. 1.

Referring by numerals to the accompanying drawing, this improved pneumatic tire traction lug rim comprises a band of strip metal 6 or other suitable material which is formed by cutting a suitable length and width of the sheet material relative to the size of the tire tread over which it is to be engaged and mounted, the meeting ends of the band being joined by welding or by other suitable means.

Secured to the outer periphery of the band, preferably by welding, are a plurality of transverse lugs 7 which in this invention are shown as being of T-iron lengths and secured by welding to the outer side or edge 8 of the band and to the ends of certain of the lugs 7 are a series of side members 9 which are projected towards the band axis.

On the inner periphery of the band and in alinement with each side member 9 and respective lugs 7 to which the side members are secured, is a transverse raised portion 10 having a tapering extending end 11, said portions 10 at their ends 12, abutting respective side members 9 and are welded thereto and to the inner periphery of the band.

This improved tire lug rim when constructed as described, is made slightly smaller in diameter on its inner periphery than is the tread diameter of the pneumatic tire on which the rim is to be mounted when the tire is deflated, therefore the tire lug rim will be made of varying diameters as may be required.

This improved tire lug rim is primarily intended for use on the traction tires of garden tractors although it is applicable to larger tractors, and when mounting the tire lug rim, the tire 13 is first deflated so that the rim can be readily mounted on the tread 14 thereof and is adjusted thereon with the side members 9 against the side wall of the tire or the side of the tire lugs, as shown in Figs. 3 and 4. As the tire rim is slid over the tire tread the raised portions 10 thereof may be engaged in respective grooves as may be formed in the tire tread, but if the tire tread is not so grooved the raised portions or ridges may press into the tread.

After mounting the lug rim on the tire, the tire is inflated and the expansion thereof will securely hold the traction lug rim on the tire tread, and while in instances the raised portions 10 may not be needed, they however, will prevent traction slip of the rim on the tire tread in the event the tire becomes slightly deflated.

From the above disclosure of this invention, it is obvious that an improved traction tire lug rim is provided and which is simple and inexpensive in its construction and can be attached and detached to and from a pneumatic tire with ease and with rapidity.

Obviously constructional modifications of the lug rim shown, are possible without departing from the spirit of the present invention and therefore it is to be understood that it is not necessary to limit the invention by the terms used in the foregoing description, excepting such as the state of the art may require.

What I claim is:

1. A traction lug rim comprising a flat metal band with spaced lugs secured on the outer periphery thereof, and said band having inwardly directed side members on one side only thereof.

2. A traction lug rim comprising a flat metal band with spaced lugs secured on the outer periphery thereof, said band having inwardly directed side members on one side only thereof, and transversely extending raised portions on its inner periphery, said band when slid over the periphery of a pneumatic tire having its transverse raised portions pressed into the tire tread and its side members in engagement with a side wall of the tire.

3. A traction rim for a pneumatic tire comprising a flat band having spaced lugs secured on its outer periphery, said band being smaller in diameter on its inner periphery than the tire on which it is to be mounted and having a series of inwardly extending members on one side only thereof.

4. A traction rim for a pneumatic tire comprising a flat band having spaced lugs secured on its outer periphery, said band being smaller in diameter on its inner periphery than the tire on which it is to be mounted whereby the tire when inflated will tightly engage the inner periphery of the band, said band having inwardly directed side members on one side only thereof for engaging the side wall of the tire.

5. A traction lug rim comprising a flexible flat band having spaced lugs secured on its outer periphery, spaced inwardly directed side members on one side only of said band, and transversely disposed raised portions on the inner periphery of said band, said portions being tapered on one end.

CLAUDE C. FULTON.

REFERENCES CITED

The following references are of record in the file of this patent:

UNITED STATES PATENTS

| Number | Name | Date |
| --- | --- | --- |
| 1,251,014 | Greenerd | Dec. 25, 1917 |
| 1,317,185 | Twombly | Sept. 30, 1919 |
| 1,435,448 | Bransfield | Nov. 14, 1922 |
| 2,190,370 | Smallwood et al. | Feb. 13, 1940 |